(12) United States Patent
Stewart

(10) Patent No.: US 7,752,840 B2
(45) Date of Patent: Jul. 13, 2010

(54) ENGINE EXHAUST HEAT EXCHANGER

(75) Inventor: Gregory E. Stewart, Vancouver (CA)

(73) Assignee: Honeywell International Inc., Morristown, NJ (US)

( * ) Notice: Subject to any disclaimer, the term of this patent is extended or adjusted under 35 U.S.C. 154(b) by 1148 days.

(21) Appl. No.: 10/907,209

(22) Filed: Mar. 24, 2005

(65) Prior Publication Data

US 2006/0213184 A1 Sep. 28, 2006

(51) Int. Cl.
*F01N 3/02* (2006.01)
(52) U.S. Cl. .............................. 60/320; 60/274; 60/278; 60/280; 60/298
(58) Field of Classification Search ................... 60/274, 60/278, 280, 298, 299, 320
See application file for complete search history.

(56) References Cited

U.S. PATENT DOCUMENTS

| | | | |
|---|---|---|---|
| 3,744,461 A | | 7/1973 | Davis |
| 3,808,805 A | * | 5/1974 | Miramontes .................. 60/274 |
| 3,968,649 A | * | 7/1976 | Edwards ...................... 60/297 |
| 4,005,578 A | | 2/1977 | McInerney |
| 4,055,158 A | | 10/1977 | Marsee |
| 4,252,098 A | | 2/1981 | Tomczak et al. |
| 4,383,441 A | | 5/1983 | Willis et al. |
| 4,426,982 A | | 1/1984 | Lehner et al. |
| 4,438,497 A | | 3/1984 | Willis et al. |
| 4,456,883 A | | 6/1984 | Bullis et al. |
| 4,485,794 A | | 12/1984 | Kimberley et al. |
| 4,601,270 A | | 7/1986 | Kimberley et al. |
| 4,653,449 A | | 3/1987 | Kamei et al. |
| 5,044,337 A | | 9/1991 | Williams |
| 5,076,237 A | | 12/1991 | Hartman et al. |
| 5,089,236 A | | 2/1992 | Clerc |
| 5,108,716 A | | 4/1992 | Nishizawa |
| 5,123,397 A | | 6/1992 | Richeson |
| 5,233,829 A | | 8/1993 | Komatsu |
| 5,282,449 A | | 2/1994 | Takahashi et al. |
| 5,349,816 A | | 9/1994 | Sanbayashi et al. |
| 5,365,734 A | | 11/1994 | Takeshima |

(Continued)

FOREIGN PATENT DOCUMENTS

DE    10219382    11/2002

(Continued)

OTHER PUBLICATIONS

"SCR, 400-csi Coated Catalyst," Leading NOx Control Technologies Status Summary, 1 page prior to the filing date of the present application.

(Continued)

*Primary Examiner*—Thomas E Denion
*Assistant Examiner*—Diem Tran
(74) *Attorney, Agent, or Firm*—Crompton Seager & Tufte LLC

(57) ABSTRACT

A heat transfer system in an engine for transferring heat from the recirculated exhaust gas to an output of an engine exhaust system. The heat transfer may cool the recirculated exhaust for reduced emissions from engine combustion and, at the same time, increase the output exhaust temperature to facilitate regeneration of an exhaust aftertreatment system. There may a heat transfer unit at the output of an exhaust gas recirculating valve connected to a heat transfer unit at the output of the exhaust system.

23 Claims, 2 Drawing Sheets

U.S. PATENT DOCUMENTS

| | | | |
|---|---|---|---|
| 5,398,502 A | 3/1995 | Watanabe | |
| 5,452,576 A | 9/1995 | Hamburg et al. | |
| 5,477,840 A | 12/1995 | Neumann | |
| 5,560,208 A | 10/1996 | Halimi et al. | |
| 5,570,574 A | 11/1996 | Yamashita et al. | |
| 5,598,825 A | 2/1997 | Neumann | |
| 5,609,139 A | 3/1997 | Ueda et al. | |
| 5,611,198 A | 3/1997 | Lane et al. | |
| 5,690,086 A | 11/1997 | Kawano et al. | |
| 5,692,478 A | 12/1997 | Nogi et al. | |
| 5,740,786 A * | 4/1998 | Gartner | 123/568.12 |
| 5,746,183 A | 5/1998 | Parke et al. | |
| 5,765,533 A | 6/1998 | Nakajima | |
| 5,771,867 A | 6/1998 | Amstutz et al. | |
| 5,785,030 A | 7/1998 | Paas | |
| 5,788,004 A | 8/1998 | Friedmann et al. | |
| 5,846,157 A | 12/1998 | Reinke et al. | |
| 5,893,092 A | 4/1999 | Driscoll | |
| 5,942,195 A | 8/1999 | Lecea et al. | |
| 5,964,199 A | 10/1999 | Atago et al. | |
| 5,974,788 A | 11/1999 | Hepburn et al. | |
| 6,029,626 A | 2/2000 | Bruestle | |
| 6,035,640 A | 3/2000 | Kolmanovsky et al. | |
| 6,048,620 A | 4/2000 | Zhong | |
| 6,055,810 A | 5/2000 | Borland et al. | |
| 6,058,700 A | 5/2000 | Yamashita et al. | |
| 6,067,800 A | 5/2000 | Kolmanovsky et al. | |
| 6,076,353 A | 6/2000 | Freudenberg et al. | |
| 6,105,365 A | 8/2000 | Deeba et al. | |
| 6,153,159 A | 11/2000 | Engeler et al. | |
| 6,161,528 A | 12/2000 | Akao et al. | |
| 6,170,259 B1 | 1/2001 | Boegner et al. | |
| 6,171,556 B1 | 1/2001 | Burk et al. | |
| 6,178,743 B1 | 1/2001 | Hirota et al. | |
| 6,178,749 B1 | 1/2001 | Kolmanovsky et al. | |
| 6,216,083 B1 | 4/2001 | Ulyanov et al. | |
| 6,237,330 B1 | 5/2001 | Takahashi et al. | |
| 6,242,873 B1 | 6/2001 | Drozdz et al. | |
| 6,263,672 B1 | 7/2001 | Roby et al. | |
| 6,273,060 B1 | 8/2001 | Cullen | |
| 6,279,551 B1 | 8/2001 | Iwano et al. | |
| 6,312,538 B1 | 11/2001 | Latypov et al. | |
| 6,321,538 B2 | 11/2001 | Hasler | |
| 6,338,245 B1 | 1/2002 | Shimoda et al. | |
| 6,347,619 B1 | 2/2002 | Whiting et al. | |
| 6,360,159 B1 | 3/2002 | Miller et al. | |
| 6,360,541 B2 | 3/2002 | Waszkiewicz et al. | |
| 6,360,732 B1 | 3/2002 | Bailey et al. | |
| 6,379,281 B1 | 4/2002 | Collins et al. | |
| 6,425,371 B2 | 7/2002 | Majima | |
| 6,427,436 B1 | 8/2002 | Allansson et al. | |
| 6,431,160 B1 | 8/2002 | Sugiyama et al. | |
| 6,463,733 B1 | 10/2002 | Asik et al. | |
| 6,463,734 B1 | 10/2002 | Tamura et al. | |
| 6,470,682 B2 | 10/2002 | Gray, Jr. | |
| 6,470,866 B2 | 10/2002 | Cook | |
| 6,502,391 B1 | 1/2003 | Hirota et al. | |
| 6,512,974 B2 | 1/2003 | Houston et al. | |
| 6,546,329 B2 | 4/2003 | Bellinger | |
| 6,560,528 B1 | 5/2003 | Gitlin et al. | |
| 6,571,191 B1 | 5/2003 | York et al. | |
| 6,579,206 B2 | 6/2003 | Liu et al. | |
| 6,612,293 B2 | 9/2003 | Schweinzer et al. | |
| 6,625,978 B1 | 9/2003 | Eriksson et al. | |
| 6,629,408 B1 | 10/2003 | Murakami et al. | |
| 6,647,710 B2 | 11/2003 | Nishiyama et al. | |
| 6,647,971 B2 | 11/2003 | Vaughan et al. | |
| 6,671,603 B2 | 12/2003 | Cari et al. | |
| 6,672,060 B1 | 1/2004 | Buckland et al. | |
| 6,679,050 B1 | 1/2004 | Takahashi et al. | |
| 6,687,597 B2 | 2/2004 | Sulatisky et al. | |
| 6,705,084 B2 | 3/2004 | Allen et al. | |
| 6,742,330 B2 | 6/2004 | Genderen | |
| 6,758,037 B2 | 7/2004 | Terada et al. | |
| 6,789,533 B1 | 9/2004 | Hashimoto et al. | |
| 6,823,667 B2 | 11/2004 | Braun et al. | |
| 6,823,675 B2 | 11/2004 | Brunell et al. | |
| 6,826,903 B2 | 12/2004 | Yahata et al. | |
| 6,827,061 B2 | 12/2004 | Nytomt et al. | |
| 7,010,910 B2 * | 3/2006 | Watanabe et al. | 60/300 |
| 2001/0002591 A1 | 6/2001 | Majima | |
| 2002/0029564 A1 | 3/2002 | Roth et al. | |
| 2002/0056434 A1 | 5/2002 | Flamig-Vetter et al. | |
| 2002/0073696 A1 | 6/2002 | Kuenstler et al. | |
| 2002/0098975 A1 | 7/2002 | Kimura et al. | |
| 2002/0170550 A1 | 11/2002 | Mitsutani | |
| 2002/0173919 A1 | 11/2002 | Moteki et al. | |
| 2002/0184879 A1 | 12/2002 | Lewis | |
| 2002/0194835 A1 | 12/2002 | Bromberg et al. | |
| 2003/0022752 A1 | 1/2003 | Liu et al. | |
| 2003/0041590 A1 | 3/2003 | Kitajima et al. | |
| 2003/0089101 A1 | 5/2003 | Tanaka et al. | |
| 2003/0101713 A1 | 6/2003 | Dalla Betta et al. | |
| 2003/0120410 A1 | 6/2003 | Cari et al. | |
| 2003/0143957 A1 | 7/2003 | Lyon | |
| 2003/0145837 A1 | 8/2003 | Esteghlal et al. | |
| 2003/0150422 A1 | 8/2003 | Huh | |
| 2003/0172907 A1 | 9/2003 | Nytomt et al. | |
| 2003/0200016 A1 | 10/2003 | Spillane et al. | |
| 2003/0213465 A1 | 11/2003 | Fehl et al. | |
| 2003/0221679 A1 | 12/2003 | Surnilla | |
| 2003/0225507 A1 | 12/2003 | Tamura | |
| 2004/0006973 A1 | 1/2004 | Makki et al. | |
| 2004/0007211 A1 | 1/2004 | Kobayashi | |
| 2004/0007217 A1 | 1/2004 | Poola et al. | |
| 2004/0025837 A1 | 2/2004 | Hunt et al. | |
| 2004/0034460 A1 | 2/2004 | Folkerts et al. | |
| 2004/0040283 A1 | 3/2004 | Yasui et al. | |
| 2004/0040287 A1 | 3/2004 | Beutel et al. | |
| 2004/0050037 A1 | 3/2004 | Betta et al. | |
| 2004/0055278 A1 | 3/2004 | Miyoshi et al. | |
| 2004/0060284 A1 | 4/2004 | Roberts, Jr. et al. | |
| 2004/0074226 A1 | 4/2004 | Tanaka | |
| 2004/0089279 A1 | 5/2004 | McLaughlin et al. | |
| 2004/0112335 A1 | 6/2004 | Makino et al. | |
| 2004/0118117 A1 | 6/2004 | Hartman et al. | |
| 2004/0128058 A1 | 7/2004 | Andres et al. | |
| 2004/0129259 A1 | 7/2004 | Mitsutani | |
| 2004/0134464 A1 | 7/2004 | Mogi | |
| 2004/0135584 A1 | 7/2004 | Nagy et al. | |
| 2004/0139735 A1 | 7/2004 | Zhu | |
| 2004/0139951 A1 | 7/2004 | Fisher et al. | |
| 2004/0249558 A1 | 12/2004 | Meaney | |

FOREIGN PATENT DOCUMENTS

| | | |
|---|---|---|
| EP | 1221544 | 7/2002 |
| JP | 59190443 | 10/1984 |
| WO | WO 02/101208 | 12/2002 |
| WO | 03065135 | 8/2003 |
| WO | WO 2004/027230 | 4/2004 |

OTHER PUBLICATIONS

Advanced Petroleum-Based Fuels-Diesel Emissions Control (APBF-DEC) Project, "Quarterly Update," No. 7, 6 pages, Fall 2002.

Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.

Amstuz, et al., "EGO Sensor Based Robust Output Control of EGR in Diesel Engines," IEEE TCST, vol. 3, No. 1, 12 pages, Mar. 1995.

Bemporad, et al., "Explicit Model Predictive Control," 1 page, prior to filing date of present application.

Borrelli, "Constrained Optimal Control of Linear and Hybrid Systems," Lecture Notes in Control and Information Sciences, vol. 290, 2003.

Catalytica Energy Systems, "Innovative NOx Reduction Solutions for Diesel Engines," 13 pages, 3$^{rd}$ Quarter, 2003.

Chatterjee, et al. "Catalytic Emission Control for Heavy Duty Diesel Engines," JM, 46 pages, prior to filing date of present application.

Delphi, Delphi Diesel NOx Trap (DNT), 3 pages, Feb. 2004.

GM "Advanced Diesel Technology and Emissions," powertrain technologies—engines, 2 pages, prior to filing date of present application.

Guzzella, et al., "Control of Diesel Engines," IEEE Control Systems Magazine, pp. 53-71, Oct. 1998.

Havelena, "Componentized Architecture for Advanced Process Management," Honeywell International, 42 pages, 2004.

Hiranuma, et al., "Development of DPF System for Commercial Vehicle—Basic Characteristic and Active Regeneration Performance," SAE Paper No. 2003-01-3182, Mar. 2003.

Honeywell, "Profit Optimizer A Distributed Quadratic Program (DQP) Concepts Reference," 48 pages, prior to filing date of present application.

http://www.not2fast.wryday.com/turbo/glossary/turbo_glossary.shtml, "Not2Fast: Turbo Glossary," 22 pages, printed Oct. 1, 2004.

http://www.tai-cwv.com/sb1106.0.html, "Technical Overview-Advanced Control Solutions," 6 pages, printed Sep. 9, 2004.

Kelly, et al., "Reducing Soot Emissions from Diesel Engines Using One Atmosphere Uniform Glow Discharge Plasma," SAE Paper No. 2003-01-1183, Mar. 2003.

Kolmanovsky, et al., "Issues in Modeling and Control of Intake Flow in Variable Geometry Turbocharged Engines", 18$^{th}$ IFIP Conf. System Modeling and Optimization, pp. 436-445, Jul. 1997.

Kulhavy, et al. "Emerging Technologies for Enterprise Optimization in the Process Industries," Honeywell, 12 pages, Dec. 2000.

Locker, et al., "Diesel Particulate Filter Operational Characterization," Corning Incorporated, 10 pages, prior to filing date of present application.

Lu "Challenging Control Problems and Engineering Technologies in Enterprise Optimization," Honeywell Hi-Spec Solutions, 30 pages, Jun. 4-6, 2001.

Moore, "Living with Cooled-EGR Engines," Prevention Illustrated, 3 pages, Oct. 3, 2004.

National Renewable Energy Laboratory (NREL), "Diesel Emissions Control- Sulfur Effects Project (DECSE) Summary of Reports," U.S. Department of Energy, 19 pages, Feb. 2002.

Salvat, et al., "Passenger Car Serial Application of a Particulate Filter System on a Common Rail Direct Injection Engine," SAE Paper No. 2000-01-0473, 14 pages, Feb. 2000.

Shamma, et al. "Approximate Set-Valued Obeservers for Nonlinear Systems," IEEE Transactions on Automatic Control, vol. 42, No. 5, May 1997.

Soltis, "Current Status of NOx Sensor Development," Workshop on Sensor Needs and Requirements for PEM Fuel Cell Systems and Direct-Injection Engines, 9 pages, Jan. 25-26, 2000.

Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.

Storset, et al., "Air Charge Estimation for Turbocharged Diesel Engines," vol. 1 Proceedings of the American Control Conference, 8 pages, Jun. 28-30, 2000.

The MathWorks, "Model-Based Calibration Toolbox 2.1 Calibrate complex powertrain systems," 4 pages, printed prior to filing date of present application.

The MathWorks, "Model-Based Calibration Toolbox 2.1.2," 2 pages, prior to filing date of present application.

Theiss, "Advanced Reciprocating Engine System (ARES) Activities at the Oak Ridge National Lab (ORNL), Oak Ridge National Laboratory," U.S. Department of Energy, 13 pages, Apr. 14, 2004.

Zenlenka, et al., "An Active Regeneration as a Key Element for Safe Particulate Trap Use," SAE Paper No. 2001-0103199, 13 pages, Feb. 2001.

* cited by examiner

ENGINE EXHAUST HEAT EXCHANGER

BACKGROUND

The present invention pertains to engines and particularly to exhaust gas recirculation. More particularly, the invention pertains to the temperature of the exhaust gas being recirculated.

SUMMARY

The invention relates to a heat exchanger between the exhaust gas being recirculated to the intake manifold and exhaust gas moving towards an aftertreatment system.

DESCRIPTION

Figure 1:
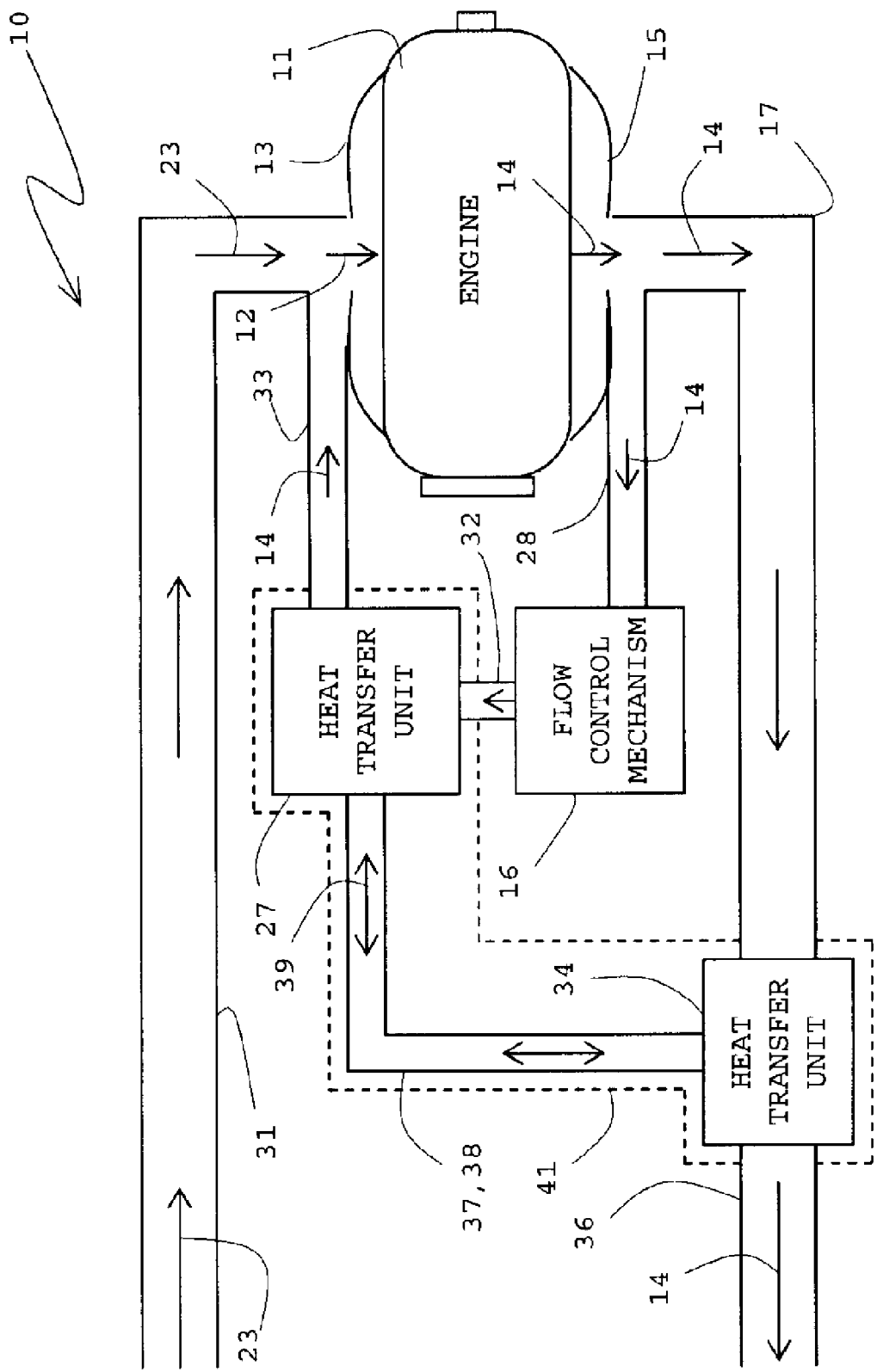
FIG. 1 is an overview layout of a heat exchange scheme for an engine.

FIG. 1 is a schematic of an engine system 10 having a heat exchanger system 41 between an exhaust manifold 15 via an exit conveyance 17 at an output conveyance 36 and an output conveyance 32 of a flow control mechanism 16. The heat transfer system 41 may contain a heat transfer unit 27 and a heat transfer unit 34 connected by a conveyance 37 and 38. Heat may be moved from one unit to another by a fluid 39. Air 23 may enter a conveyance 31 and enter an intake manifold 13 of intake system 43 of an engine 11. The engine 111 may output an exhaust 14 into an exhaust manifold 15 and then onto an exit conveyance 17 of exhaust system 45. Some of the exhaust gas 14 may go through a re-circulative conveyance 28 (commonly known as exhaust gas recirculation (EGR)) to the flow control mechanism 16 which controls the flow of exhaust gas 14 through it. The output conveyance 32 may carry some exhaust gas 14, as permitted by mechanism 16, which goes to the heat transfer unit 27. The exhaust gas 14 may exit the heat transfer unit 27 into a conveyance 33 which leads the gas 14 into the intake system 43 and mix with air 23 into a combination input air 12 which may enter the engine 11. Fuel may be added in the intake system 43 or in the engine 11. The exhaust gas 14 from conveyance 17 may go through the heat transfer unit 34. The exhaust gas may proceed out of unit 34 into the output conveyance 36.

In an engine, for example, a turbo-charged diesel engine, there may be a preference to cool the exhaust gas recirculation (EGR) flow to reduce pollutant emissions from engine combustion. Also, there may be a preference to increase the post-turbine exhaust temperature at times to facilitate a regeneration of an aftertreatment system for the engine. The aftertreatment system may be, for example, a diesel particulate filter (DPF) which requires periodic regeneration to oxidize (burn off) the collected soot or particulate matter (PM) and may require a minimum temperature to achieve light-off of the collected soot. The aftertreatment system may also or instead be a diesel oxidation catalyst (DOC), and/or a continuously regenerated trap (CRT), but is not limited to these examples.

The preference for cooling the EGR and heating the post-turbine exhaust may accomplished with heat transfer. Unwanted heat may be taken from the EGR path and transferred to the post-turbine exhaust. This is thermodynamically feasible since the post-turbine exhaust is about 200 degrees C. cooler than the gas in the EGR path.

Figure 2:
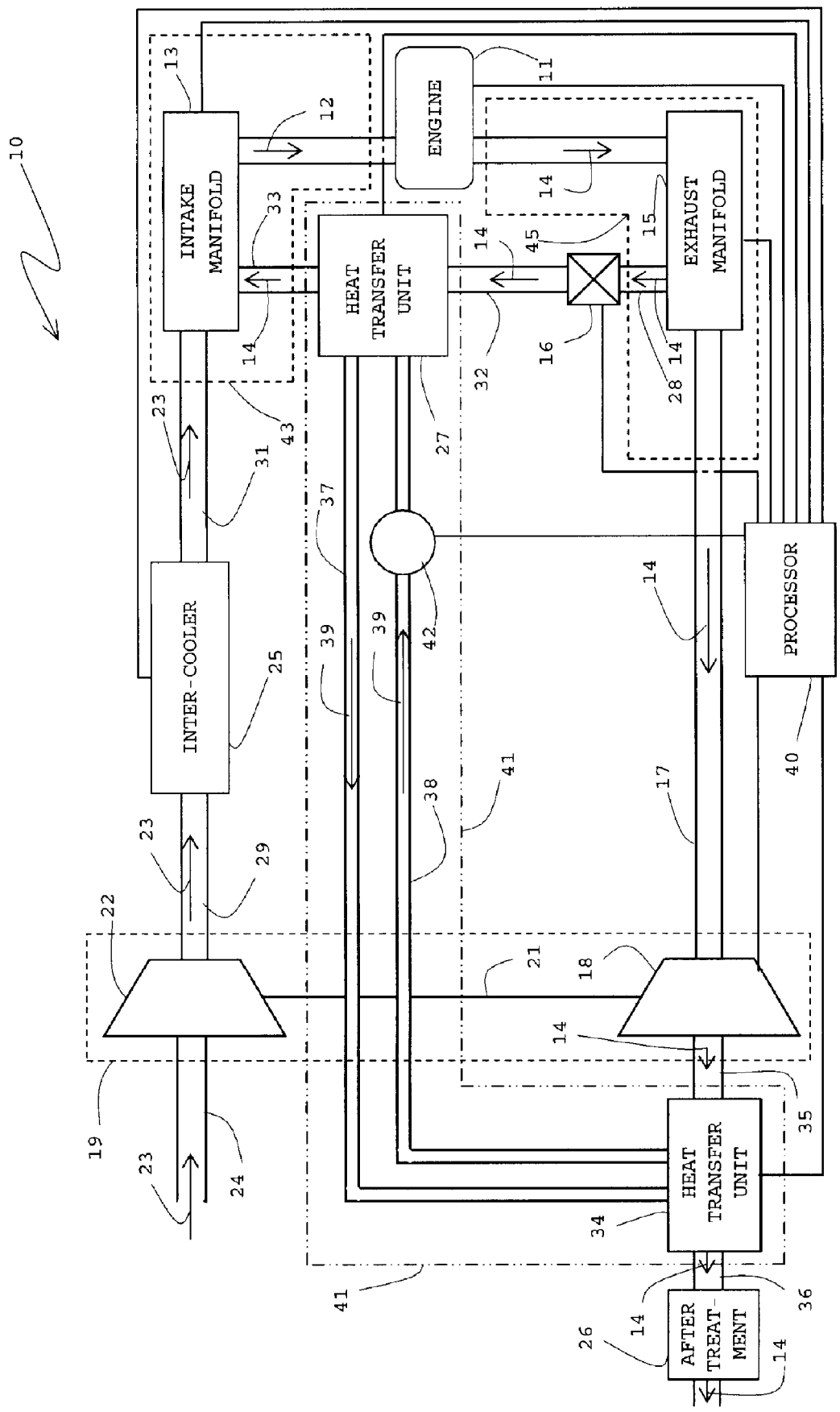
FIG. 2 shows a more detailed layout of an engine with an exhaust and intake system, and a heat exchange circuit between the recirculated gas and post-turbine gas.

FIG. 2 shows the heat transfer accomplishable by connecting the exhaust and EGR paths thermally with a heat exchanger approach in the engine system 10. Engine 11 may intake air and exhaust gas mixture 12 from an intake manifold 13, provided the EGR valve 16 is open. The mixture 12 may have fuel added and go to one or more cylinders of engine 11 and be ignited into an expanding gas to push the one or more cylinders resulting in turning a crankshaft having a power output for vehicle propulsion or other purposes. The expanded and burnt gas 14 may exit engine 11 and go into the exhaust manifold 15. Some of the exhaust gas 14 from manifold 15 may go to the EGR valve 16 via conveyance mechanism 28 and the remaining gas 14 may go through the exhaust pipe 17 to a turbine 18 of a turbo-charger 19 (which may, for instance, be a variable geometry turbo-charger). The turbine 18 may be rotated by a flow of exhaust gas 14 going through it. Turbine 18 may be mechanically connected to, as shown by a line 21, a compressor 22. The rotation of turbine 18 may result in a rotation of a compressor wheel or the like in compressor 22 which compresses incoming air 23 taken in through an input port 24 and outputs the compressed air 23 to an intercooler 25 via conveyance mechanism 29. When air 23 is compressed, it may have a significant increase in temperature. The intercooler 25 may cool the air 23 so that it is denser as it enters intake manifold 13 via conveyance mechanism 31 from inter-cooler to mix with an exhaust gas 14 for mixture 12. Fuel may be added to mixture 12 in the manifold 13. Alternatively, the fuel may be mixed with the air in the cylinder head of the engine 11 via a fuel injector. Also, exhaust gas 14 may be added to the incoming air 23 for a mixture 12 in manifold 13 for more effective combustion and lower emissions from engine 11.

It may be advantageous to have cooler exhaust gas 14 enter the intake manifold 13. Further, it may be advantageous to heat the exhaust gas 14 coming out of turbine 18 in order to facilitate a regeneration of an emissions aftertreatment system 26, which may be, for example, a diesel particulate filter (DPF). A heat transfer unit 27 may be inserted in the path of gas 14 going from EGR valve 16 to manifold 13, and between conveyance mechanisms 32 and 33. Another heat transfer unit 34 may be inserted in path of exhaust gas 14 from turbine 18 to aftertreatment system 26, and between conveyance mechanisms 35 and 36.

Heat transfer units 27 and 34 may be connected to each other by conveyance mechanisms or tubes 37 and 38. A fluid 39 may flow from heat transfer unit 27 to heat transfer unit 34 via tube 37. Fluid 39 may flow from heat transfer unit 34 to heat transfer unit 27 via tube 38. A pump 42 or fluid mover may facilitate a flow or movement of fluid 39 in tubes 37 and 38. Heat transfer units 27 and 34 may be devices having tubes or the like woven in the path of the exhaust gases 14. For instance, if the fluid 39 in tube 37 flows through heat transfer unit 34 and has a temperature higher than the temperature of the exhaust gas 14, then heat may transfer from fluid 39 to exhaust gas 14 via heat transfer unit 34. As a result, fluid 39 may be cooled down in heat transfer unit 34 and returned to heat transfer unit 27 through tube 38 at a temperature lower than the temperature of fluid 39 in tube 37. Also, exhaust gas 14 may be heated up in heat transfer unit 34 by the hotter fluid 39. Fluid 39 in tube 38 may flow through heat transfer unit 27. If the fluid 39 from tube 38 flows through heat transfer unit 27 and has a temperature lower than the temperature of the exhaust gas 14 there, then heat may transfer from the exhaust gas 14 to fluid 39 via the heat transfer unit 27. As a result, fluid 39 may heated up in heat transfer unit 27 and go to heat transfer unit 34 through tube 37 at a temperature higher than the fluid 39 in tube 38. Also, exhaust gas 14 may be cooled down in heat transfer unit 27 by the cooler fluid 39. Thus, the temperature of exhaust gas 14 in conveyance mechanism 33 may be cooler than the temperature of gas 14 in conveyance mechanism 32. Conversely, the temperature of the exhaust gas 14 in conveyance mechanism 36 may be hotter than the temperature of the exhaust gas 14 in conveyance mechanism 35. However, if the exhaust gas 14 going through heat transfer unit 34 is hotter than the exhaust gas 14 going through heat transfer unit 27, then there may be a heat transfer from the exhaust gas 14 exiting turbine 18 to the exhaust gas 14 exiting the EGR valve 16, instead. The latter may occur with a cold engine 11 or cold ambient air 23 entering the intake manifold 13. If there is no reason for the latter, the flow of fluid 39 need not occur.

Fluid 39 flow in tubes 37 and 38 and through heat transfer units 27 and 34 may be facilitated or halted by pump 42 or other similar mechanism. If heat transfer is not desired from one heat transfer unit to the other heat transfer unit, then the flow of fluid 39 may be halted. Tubes 37 and 38, fluid 39 and heat transfer units 27 and 34 may have physical properties and design characteristics to appropriately withstand the high temperatures as incurred by the respective components of a heat exchanger system 41. The exhaust gas 14 of the EGR valve 16 path into conveyance mechanism 32 may typically have a temperature around 850 degrees K (577 degrees C., 1070 degrees F.). The exhaust gas 14 of the post-turbine 18 path in conveyance mechanism 35 may typically have a temperature around 700 degrees K (427 degrees C., 800 degrees F.).

Engine system 10 may have a processor 40, such as an engine control unit (ECU) or computer, connected to various components of the system. Processor 40 may be connected to components of engine 11 for measuring temperature, timing and other parameters and for controlling various aspects and parameters of engine 11 operations. Processor 40 may also be connected to sensors at the intake manifold 13 to measure temperature, pressure, flow, fuel mixture and to control air and fuel mixture intake, connected to sensors at the exhaust manifold 15 to measure temperature and flow, and connected to sensors at turbine 18 to measure temperature and to actuators to control the variable geometry components of the turbine. Processor 40 also may be connected to EGR valve 16 to control its opening and measure flow through it and temperature. Processor 40 may be connected to pump 42 to control the flow of fluid 39. Processor 40 may be connected to sensors at heat transfer unit 27 to measure in and out temperatures of unit 27, so as to appropriately monitor and control the flow of fluid 39 through the unit 27. Processor 40 may be connected to sensors at the heat transfer unit 34 to measure in and out temperatures and note fluid 39 flow through the unit. Also, processor 40 may be connected to sensors and an actuator at the inter-cooler 25 to measure temperatures and control the effectiveness of the inter-cooler 25 on the incoming air 23. Sensors and actuators are not necessarily shown in the Figures.

Processor 40 may, in particular, monitor and control the effects of the heat exchange system 41. Also, engine 11 and other associated components may be monitored and controlled for attaining appropriate conditions and operation of engine 11.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A heat exchange method comprising:
providing an exhaust gas recirculating path from an exhaust system to an intake system of an engine internal combustion;
providing an outlet path from the exhaust system; and
transferring heat from the exhaust gas recirculating path to the outlet path from the exhaust system.

2. The method of claim 1, wherein the transferring heat from the exhaust gas recirculating path is for cooling the recirculating path to reduce emissions from combustion of the engine.

3. The method of claim 1, wherein the transferring heat to the outlet path is for attaining a temperature of an exhaust gas in the outlet path to facilitate a regeneration of an aftertreatment system.

4. The method of claim 3, wherein the aftertreatment system is selected from a group containing a particulate filter, an oxidation catalyst, a continuously regenerated trap, and the like.

5. The method of claim 1, wherein:
the engine has a turbo-charger comprising a turbine in the exhaust system and a compressor in the intake system;
the turbine is situated in the exhaust system between the engine and the outlet path; and
the transferring heat from the recirculating path to the outlet path is for heating an exhaust gas from an outlet of the turbine.

6. The method of claim 5, wherein the heating an exhaust gas is to facilitate regenerating an aftertreatment system connected to the outlet path of the exhaust system.

7. The method of claim 1, wherein:
the engine has a turbo-charger comprising a turbine in the exhaust system and a compressor in the intake system;
the compressor is situated in the intake system between an inlet path and the recirculating path; and
the transferring heat from the recirculating path to the outlet path is for cooling an exhaust in the recirculating path.

8. The method of claim 7, wherein the cooling an exhaust gas in the recirculating path is to facilitate a reduction of emissions in the exhaust system from the engine.

9. A heat exchange system comprising:
a first heat transfer unit situated in a recirculated exhaust gas path from an exhaust system to an intake system of an engine internal combustion;
a second heat transfer unit situated in an exhaust gas path from an exhaust system of the engine to an outlet of the exhaust system; and
a fluid conveyance mechanism connected to the first and second heat transfer units.

10. The system of claim 9, wherein the fluid conveyance mechanism comprises a flow path for a fluid to move between the first heat transfer unit and the second heat transfer unit.

11. The system of claim 10, wherein if a first exhaust gas in the recirculated exhaust gas path from the exhaust system to the intake system of the engine is hotter than a second exhaust gas in the exhaust gas path from the exhaust system of the engine to the outlet of the exhaust system, then heat may be conveyed from the first heat transfer unit to the second heat transfer unit by the fluid via the flow path.

12. The system of claim 10, wherein if the second exhaust gas in the exhaust gas path from the exhaust system of the engine to the outlet of the exhaust system is hotter than the first exhaust gas in the recirculated exhaust gas path from the exhaust system to the intake system of the engine, then heat may be conveyed from the second heat transfer unit to the first heat transfer unit by the fluid via the flow path.

13. The system of claim 10, wherein if no heat is to be conveyed between the first heat transfer unit and the second heat transfer unit, then the fluid in the flow path between the first heat transfer unit and the second heat transfer unit may be stopped.

14. A heat transfer apparatus comprising:
a flow control mechanism connected to an exhaust system of an engine internal combustion;
a first heat transfer unit connected to the flow control mechanism and to an intake system of the engine; and
a second heat transfer unit connected to the exhaust system and to the first heat transfer unit.

15. The apparatus of claim 14, wherein if a second exhaust gas going through the second heat transfer unit is hotter than a first exhaust gas going through the first heat transfer unit, then heat may go from the second exhaust gas via the second heat transfer unit and first heat transfer unit to the first exhaust gas, to heat air entering the engine.

16. The apparatus of claim 14, wherein if a first exhaust gas going through the first heat transfer unit is hotter than a second exhaust gas going through the second heat transfer unit, then heat may go from the first exhaust gas via the first heat transfer unit and the second heat transfer unit to the second exhaust gas.

17. The apparatus of claim 16, wherein the first and second heat transfer units are for decreasing a temperature of the first exhaust gas and increasing a temperature of the second exhaust gas.

18. The apparatus of claim 17, wherein:
the first exhaust gas may be cooled for reducing emissions in the exhaust system at combustion of the engine; and
the second exhaust gas may be heated for facilitating regeneration of an aftertreatment system connected to the exhaust system.

19. The apparatus of claim 16, wherein:
a turbine of a turbo-charger of the engine is connected between the exhaust system and the second heat transfer unit; and
the second exhaust gas may go from the exhaust system through the turbine to the second heat transfer unit.

20. Means for heat transfer comprising:
means for controlling a flow of exhaust gas from the exhaust system of an engine internal combustion to an intake system of the engine; and
means for transferring heat from the flow of exhaust gas to the intake system to a flow of exhaust gas to outside the engine.

21. The means of claim 20, further comprising a means for aftertreatment of the flow of exhaust gas to outside the engine.

22. The means of claim 20, wherein:
the means for transferring heat may decrease a temperature of the flow of the exhaust gas to the intake system; and
the means for transferring heat may increase the temperature of the flow of the exhaust gas to the means for aftertreatment.

23. The means of claim 22, wherein:
to decrease the temperature of the flow of the exhaust gas to the intake system may reduce emissions in the exhaust system at combustion of the engine; and
to increase the temperature of the flow of the exhaust gas outside of the engine may facilitate regeneration of the means for aftertreatment.

* * * * *